(12) United States Patent  
Gibbons

(10) Patent No.: US 9,345,229 B2  
(45) Date of Patent: May 24, 2016

(54) LIVESTOCK FEEDING RACK

(71) Applicant: Truman Gibbons, Tipton, MI (US)

(72) Inventor: Truman Gibbons, Tipton, MI (US)

( * ) Notice: Subject to any disclaimer, the term of this patent is extended or adjusted under 35 U.S.C. 154(b) by 0 days.

(21) Appl. No.: 14/268,541

(22) Filed: May 2, 2014

(65) Prior Publication Data

US 2015/0313174 A1 Nov. 5, 2015

(51) Int. Cl.
*A01K 1/10* (2006.01)

(52) U.S. Cl.
CPC ........................... *A01K 1/10* (2013.01)

(58) Field of Classification Search
CPC ........................................................ A01K 1/10
USPC ............................................ 119/60, 61.1, 58
See application file for complete search history.

(56) References Cited

U.S. PATENT DOCUMENTS

| 48,093 | A |  | 6/1865 | Ray | |
| 205,522 | A | * | 7/1878 | Blair | 119/58 |
| 212,027 | A | * | 2/1879 | Martindale | 119/58 |
| 335,384 | A |  | 2/1886 | Phillips | |
| 436,112 | A |  | 9/1890 | Atkinson | |
| 5,000,122 | A |  | 3/1991 | Smith | |
| 5,311,840 | A | * | 5/1994 | Rumbaugh | 119/60 |
| 5,386,800 | A |  | 2/1995 | Pirok | |
| 6,006,696 | A | * | 12/1999 | Mann et al. | 119/60 |
| 6,789,504 | B1 | * | 9/2004 | O'Neill | 119/58 |
| D548,896 | S |  | 8/2007 | Stewart | |
| 7,644,682 | B2 |  | 1/2010 | Lerner et al. | |
| 2010/0212597 | A1 |  | 8/2010 | Wolfe | |
| 2013/0112147 | A1 |  | 5/2013 | Drury | |
| 2014/0020632 | A1 | * | 1/2014 | Koch | 119/60 |
| 2015/0020740 | A1 | * | 1/2015 | Lacey | 119/60 |

FOREIGN PATENT DOCUMENTS

GB 2427116 12/2006

* cited by examiner

*Primary Examiner* — Lisa Tsang  
*Assistant Examiner* — Magdalena Topolski  
(74) *Attorney, Agent, or Firm* — Dinsmore & Shohl LLP

(57) ABSTRACT

Farmers utilize a rack to provide limited access to a bale to feeding livestock. A rack for feeding a bale to animals is provided including at least one rotating weight-activated rail containing the bale within the rack. The rotating weight-activated rail includes at least one arm projecting downward under the bale. A weight of the bale acting upon the arm projecting downward under the bale causes the rotating weight-activated rail to rotate against the bale and contain the bale while the livestock is feeding.

10 Claims, 11 Drawing Sheets

LIVESTOCK FEEDING RACK

TECHNICAL FIELD

This disclosure is related to an object for use in animal husbandry. In particular, the disclosure is related to a rack that holds a bale of hay or similar feed and provides controlled access to the bale by livestock.

BACKGROUND

The statements in this section merely provide background information related to the present disclosure. Accordingly, such statements are not intended to constitute an admission of prior art.

Farmers feed hay and similar food materials to grazing livestock. According to a known method, farmers cut hay, permit the cut hay to dry out, and then bale the hay. Modern practices tend to produce either round bales or large "square" bales, bales which require a tractor with hydraulic lifts to move the bales. Round bales are cylindrical in shape and tend to come in four foot bales (four feet in diameter, six feet long,) five foot bales (five feet in diameter, six feet long,) and six foot bales (six feet in diameter, six feet long.) Large "square" bales are rectangular and tend to either be three feet by four feet by eight feet or four feet by four feet by eight feet. The bales are formed by a baler device, typically towed behind a tractor and receiving power from a power take off shaft known in the art. A baler scoops a trail of dried cut hay off of the ground, manipulates the hay within the baler into a desired shape, and then wraps the completed bale in twine to keep the bale in the desired shape. Bales are advantageous because the hay can be kept for long periods without rain or other intrusive materials ruining the hay. A line of bales can be arranged and covered with a tarp for added protection.

Farmers can acquire bales one at a time and provide the bales to the livestock for food. Bales are especially useful in conditions where the animals cannot get to enough grass in a pasture to sustain the animals. The animals will eat the hay so long as the hay is kept off of the ground and not spoiled. However, if a bale is exposed to a herd of animals, the animals would tear the hay bale apart with most of the hay being trampled underfoot and spoiled before being eaten.

Hay racks are known in the art to separate the animals from the hay bale and mitigate the animals' tendency to tear the bale apart. One typical hay rack includes rigid a six to eight foot diameter ring made of bars and panels which is rolled into place and set over a round bale, with openings through which livestock can poke their head. Other hay racks include raised platforms with a ring or box of bars and panels similarly permitting the animals to poke their heads through to reach the hay. Rigid hay hacks tend to waste hay, for example, as the bale gets smaller. The animals pull off slabs of hay from the bale and some of the hay falls down to the ground within the ring or can be easily grabbed and pulled out of the hay rack on onto the ground. Twenty to thirty percent waste on a bale is not uncommon with a rigid rack known in the art.

SUMMARY

Farmers utilize a rack to provide limited access to a bale to feeding livestock. A rack for feeding a bale to animals is provided including at least one rotating weight-activated rail containing the bale within the rack. In one embodiment, the rotating weight-activated rail includes at least one arm projecting downward under the bale. A weight of the bale acting upon the arm projecting downward under the bale causes the rotating weight-activated rail to rotate against the bale and contain the bale while the livestock is feeding.

BRIEF DESCRIPTION OF THE DRAWINGS

One or more embodiments will now be described, by way of example, with reference to the accompanying drawings, in which.

DETAILED DESCRIPTION

Farmers use large proportions of their farmland and pay fuel to harvest crops to feed their livestock. Wasted feed is a loss to the farmer, both in money spent to raise and harvest the feed and in lost productivity for the land. A device is provided that reduces waste in feeding large bales to livestock. The device includes at least one rotating weight-activated rail which contains the bale as the bale is depleted and provides limited access for the livestock to the bale. In one embodiment, two rotating weight-activated rails are juxtaposed on opposite sides of the bale such that, as the bale is depleted, the rails press against the bale and aid in keeping the bale intact.

Hay racks can be specifically designed for a number of different types of animals. Cattle grown in American agriculture tend to have a particular shape and size or range of sizes associated with their heads, necks, and shoulders. The rack of the present disclosure can provide openings for cattle to poke their heads in and reach the bale without permitting the cattle to get their whole heads in and engage their shoulders to the rack. Cattle tend to push and be rough with equipment which they can press their shoulders against. However cattle will not tend to push hard against an object when only their nose or the sides of their heads are against the object. Further, if the animal can reach its head fully within the rack, it is more likely to try to pull large chunks of hay out of the rack, whereas if only a portion of the animals' head is within the rack, it is more likely to just eat the hay in front of it within the rack. The present disclosure provides gaps that are not greater than a critical width. According to some embodiments the critical width is between eight and eleven inches. According to some embodiments, the critical width is nine inches. Other embodiments are envisioned, for example, providing limited access to sheep, horses, goat, and llamas, and the critical dimension of the rack can be adjusted for the intended animal. A critical width cannot get too small, as the fibers of bale can become difficult to access and pull through the gaps if the width is too small.

Figure 1:
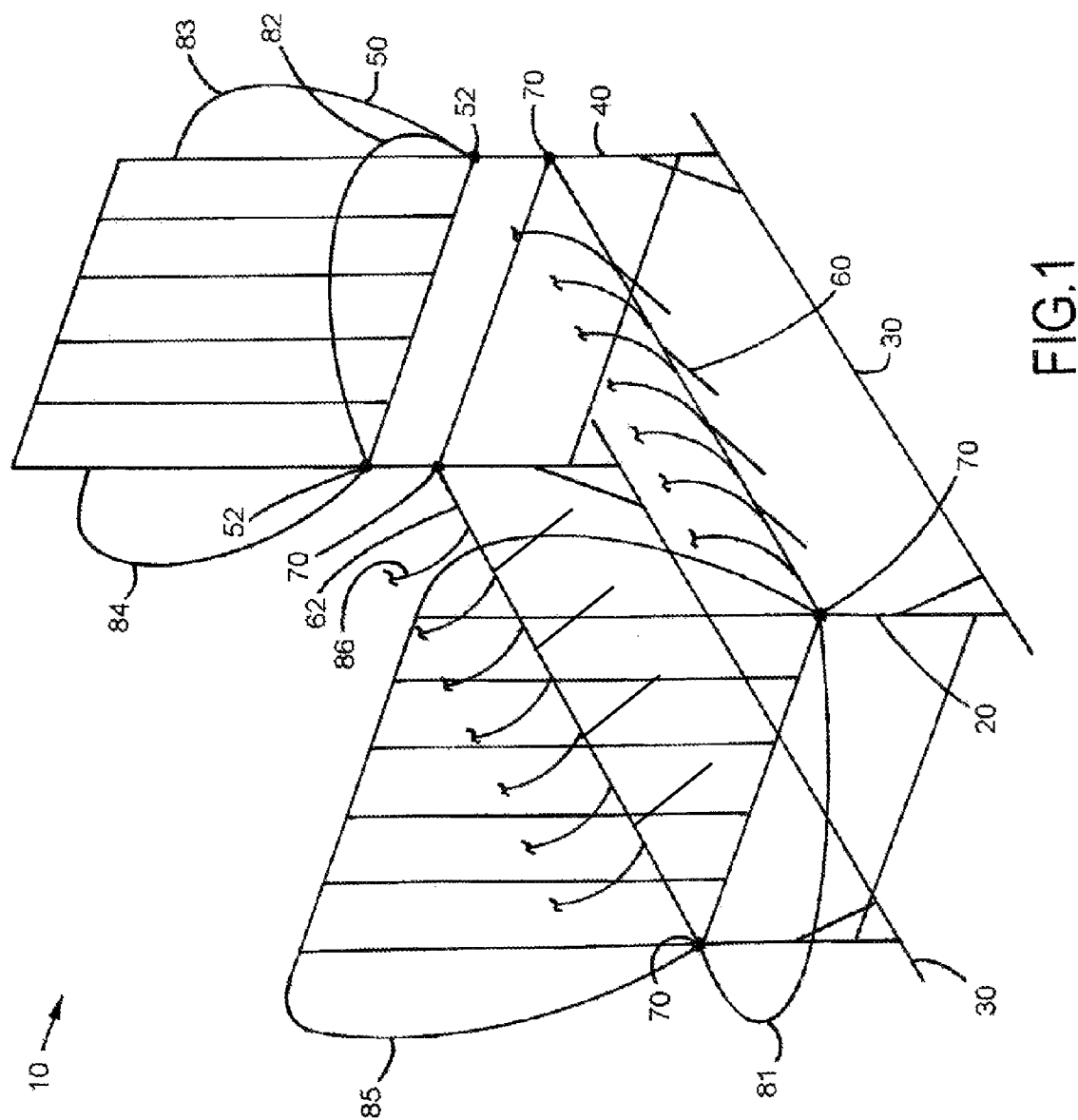
FIG. 1 illustrates an exemplary rack for holding a bale and providing livestock limited access to be bale, in accordance with the present disclosure.
Figure 9:
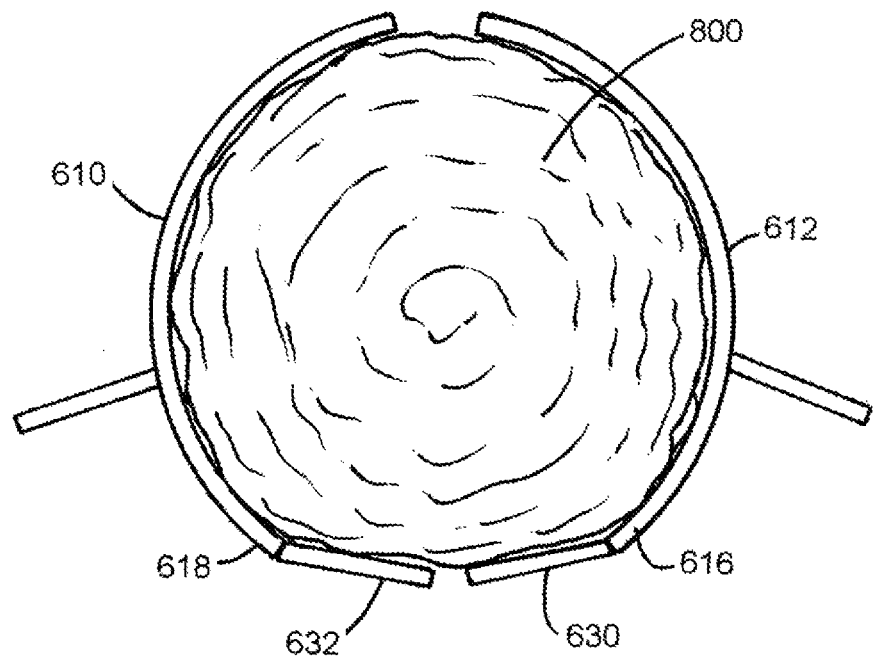
FIG. 9 illustrates the weight-activated rails of FIG. 6 with a fresh bale situated thereto, in accordance with the present disclosure.
Figure 10:
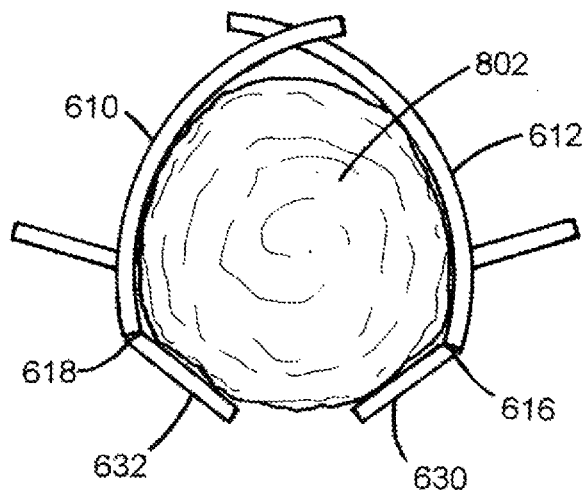
FIG. 10 illustrates the weight-activated rails of FIG. 9, in accordance with the present disclosure.
Figure 11:
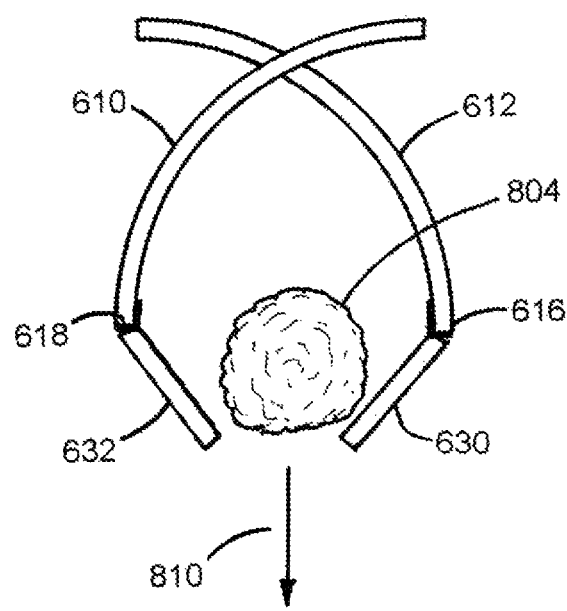
FIG. 11 illustrates the weight-activated rails of FIG. 9, wherein the bale situated within the rack has been fully depleted, in accordance with the present disclosure.

Referring now to the drawings, wherein the showings are for the purpose of illustrating certain exemplary embodiments only and not for the purpose of limiting the same, FIG. 1 illustrates an exemplary rack for holding a bale and providing livestock limited access to be bale. FIG. 1 is illustrated in stick form for clarity. It will be appreciated that the structured disclosed herein can be created out of any number of materials (e.g. different types of steel or other alloys) and types of material (e.g. angle steel, hollow round or square tubing, rebar, solid bars, etc.) The different lengths of tubing and metal pieces can be attached according to a number of known methods including welding. Rack 10 is illustrated including end support 20 and end support 40 connected by two rigid horizontal struts 30. End support 40 can be a rigid unitary wall structure. In the embodiment of FIG. 1, end support 40 includes hinges 52, such that a door 50 can be swung down outside of rack 10 to facilitate loading of a bale into the rack. Two rotating weight-activated rails 60 and 62 are illustrated, pivotably attached to the end supports 20 and 40 at hinges 70. Arms projecting down from rails 60 and 62 are illustrated. Arms projecting upward from rails 60 and 62 are illustrated as truncated illustrations for clarity sake. The arms projecting upward are long and wrap around a bale loaded into the rack as is illustrated in FIGS. 9-11.

The arms of rails 60 and 62 and the vertical poles of the end supports are spaced according to a critical width for the animals being fed to avoid over-exposing the bale to the animals. However, when a fresh bale is located into the rack, the arms of rails 60 and 62 can be so far extended that the animals can have undesirably great access to the bale between the side arms of rails 60 and 62 and the side supports. As a result, auxiliary rails 83, 84, 85, and 86 are illustrated projecting in a plane defined by the end supports 20 and 40, such that any gap between the arms of rails 60 and 62 and the adjacent side supports 20 and 40 is blocked. Additionally, it can be beneficial to maintain some distance from the animal and the center portion of the rack. Diverting rails 81 and 82 are illustrated extending horizontally outward from end supports 20 and 40, respectively. Additional diverting rails can be attached to rails 60 and 62 to prevent an animal from getting too close to the sides of the rails 60 and 62.

Figure 2:
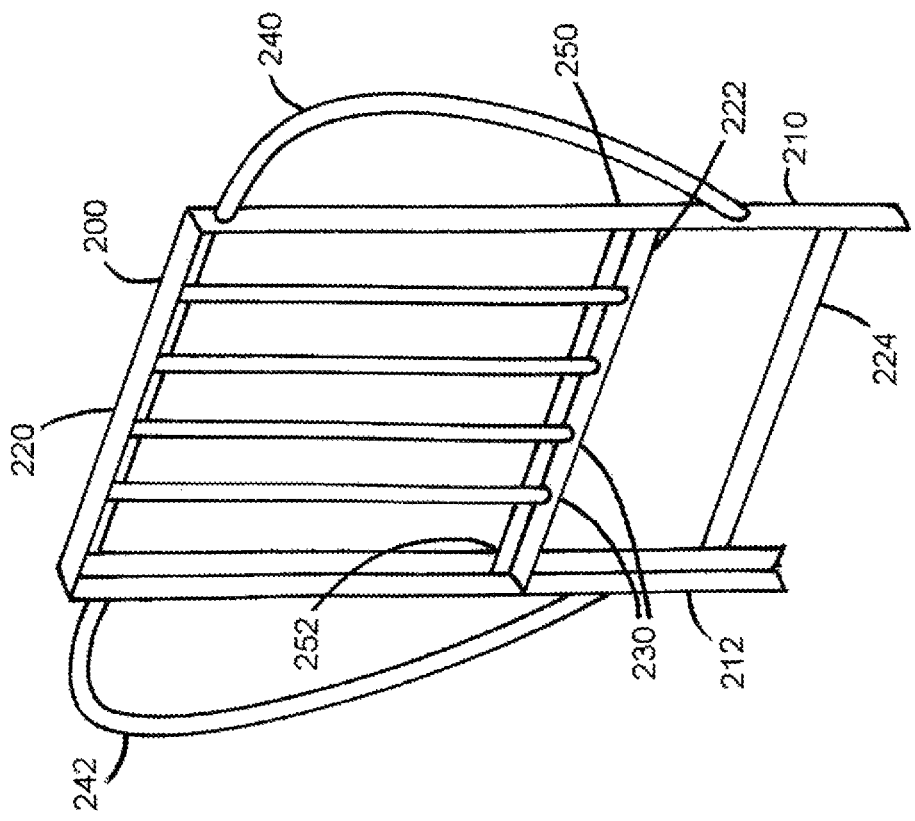
FIG. 2 illustrates an exemplary rigid side support for use with a rack, in accordance with the present disclosure.

FIG. 2 illustrates an exemplary rigid side support for use with a rack. Side support 200 is exemplary of side support 20 in FIG. 1 and is illustrated including vertical members 210 and 212 and horizontal members 220, 222, and 224 constructed of exemplary angle steel. Horizontal bars 230 and auxiliary rails 240 and 242 are constructed of exemplary 1¼" tubing.

Figure 3:
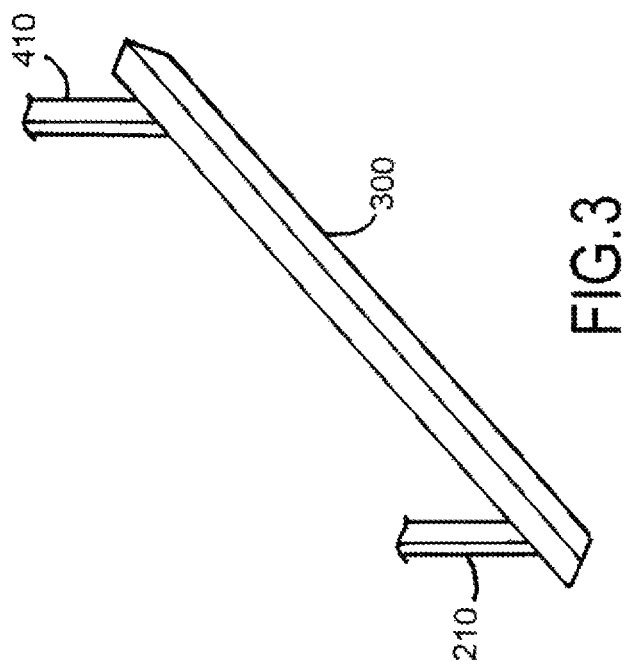
FIG. 3 illustrates an exemplary horizontal strut connecting two end supports, in accordance with the present disclosure.

FIG. 3 illustrates an exemplary horizontal strut connecting two end supports. Horizontal strut 300 is exemplary of horizontal strut 30. Strut 300 connects end support vertical members 210 and 410 to provide structure to the rack. While one strut is shown, it will be appreciated that a number of struts and diagonal reinforcing members can be utilized to improve rigidity and stability of the rack. Further, strut 300 can optionally include a flat bottom and angled ends so that the rack can be moved easily from one location to another by sliding along the ground. It will also be realized that the rack can also be moved by a tractor using forks of a lift to scoop the rack. Any number of materials and material configurations can be used for horizontal struts 300 including steel, wood, polymers, or any material or combination of materials that can maintain rigidity of the rack while surviving in the caustic soil and waste environment of a pasture or animal pen.

Figure 4:
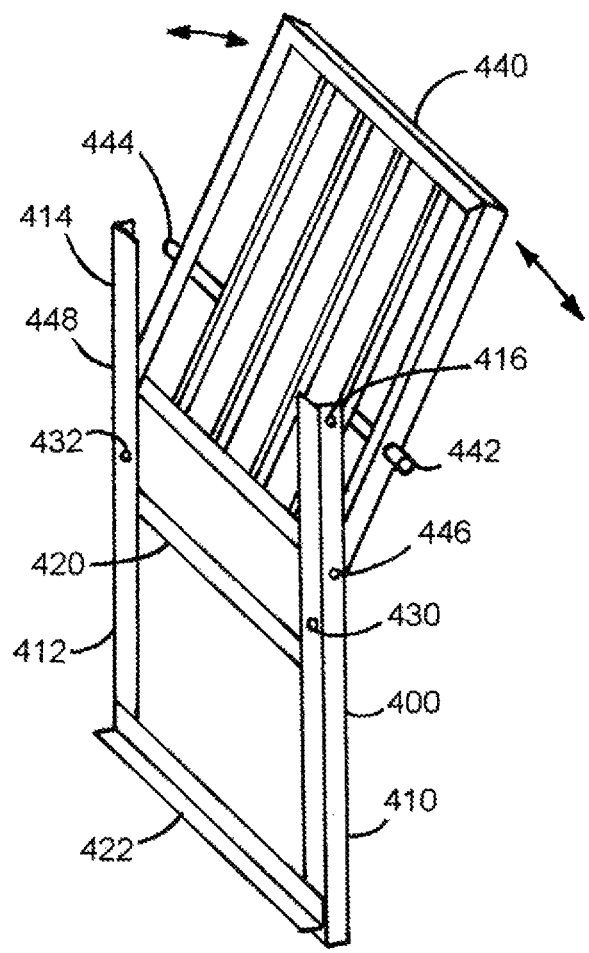
FIG. 4 illustrates an exemplary end support including an opening door, in accordance with the present disclosure.

FIG. 4 illustrates an exemplary end support including an opening door. End support 400 is illustrated including vertical members 410 and 412 and horizontal members 420 and 422 constructed of exemplary angle steel. Door 440 is illustrated similarly constructed with a rectangular frame of angle steel and with a set of horizontal bars constructed of exemplary square tubing. Door 440 is connected to vertical members 410 and 412 at hinges 446 and 448, respectively. Door 440 is configured to be opened when a user is loading a fresh bale into the rack and to be closed and locked when the rack is full. A number of methods are envisioned to secure the door closed. In the embodiment of FIG. 4, two bolt-type locks 442 and 444 are configured to secure to hole 416 in vertical member 410 and hole 414 in vertical member 412, respectively. Holes 430 and 432 are provided to hold two rotating weight-activated rails along the sides of the rack, in accordance with embodiments disclosed herein. Holes 430 and 432 could alternatively be formed in member 420. Multiple holes can be provided such that a user could adjust how the rails rotate, for example, adjusting for different size bales. Vertical members 410 and 412 should be tall enough to secure to locks 442 and 444, but if the vertical members are too tall, the tops of the members can interfere with placing a fresh bale in the rack. Auxiliary rails and diverting rails can be attached to door 440 according to embodiments disclosed herein.

Figure 5:
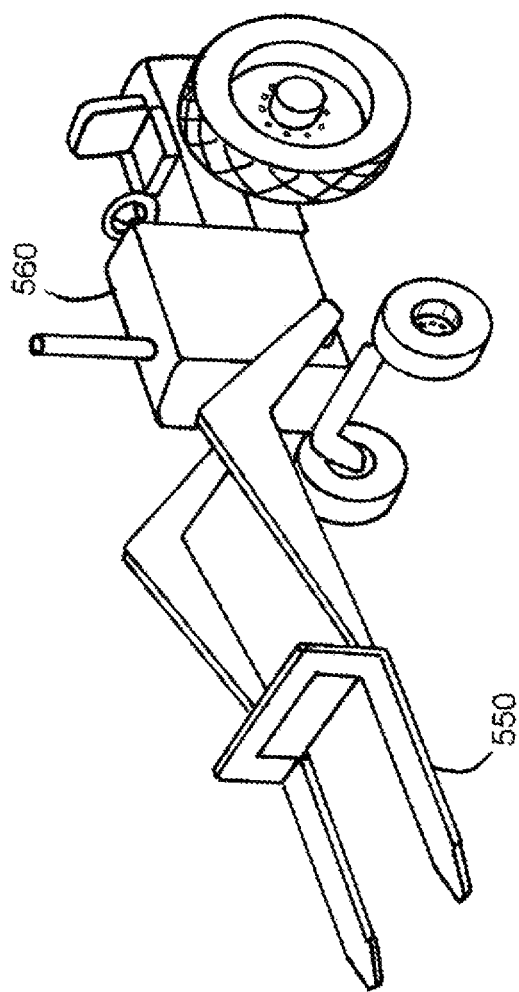
FIG. 5 illustrates an alternative exemplary embodiment of an end support configured to permit loading of a bale into a rack, in accordance with the present disclosure.
Figure 5:
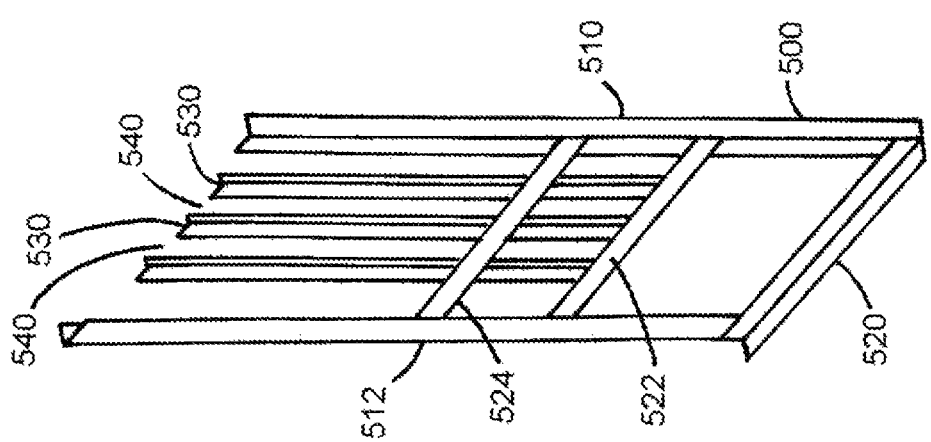

FIG. 5 illustrates an alternative exemplary embodiment of an end support configured to permit loading of a bale into a rack. End support 500 is exemplary of end support 20 or 40 and includes vertical members 510 and 5112 and horizontal members 520, 522, and 524. A set of rigid vertical poles 530 are configured with open ends 540, such that an exemplary tractor 560 equipped with front end loader forks 550 configured to pole and carry a bale can lift the bale over end support 500, lower the forks 550 such that the forks fall within the open ends 540. Tractor 560, once the bale is loaded in the rack, can then back out and pull the forks 550 from the rack through the gaps between the vertical poles 530.

FIGS. 2, 4, and 5 illustrate end supports as including bars, rails, and supports that provide gaps at or narrower than the critical width for a particular type of livestock. Any of the surfaces disclosed herein can be replaced or reinforced with sheet metal and/or reinforcing ribs. For example, a rack meant for a zoo to feed rhinoceroses needs to be substantially more durable than a rack meant to feed sheep. Such a rack can additionally change positions of diverting rails, for example, lowering them, to avoid snaring the animals nose horns. Such a reinforced design can include thicker gage poles and angle steel to provide additional strength. Any surface blocked off with reinforcement members or sheets reduce the amount of access that the animals have to the bale within the rack, but such reinforced racks are within the scope of the present disclosure.

Figure 6:
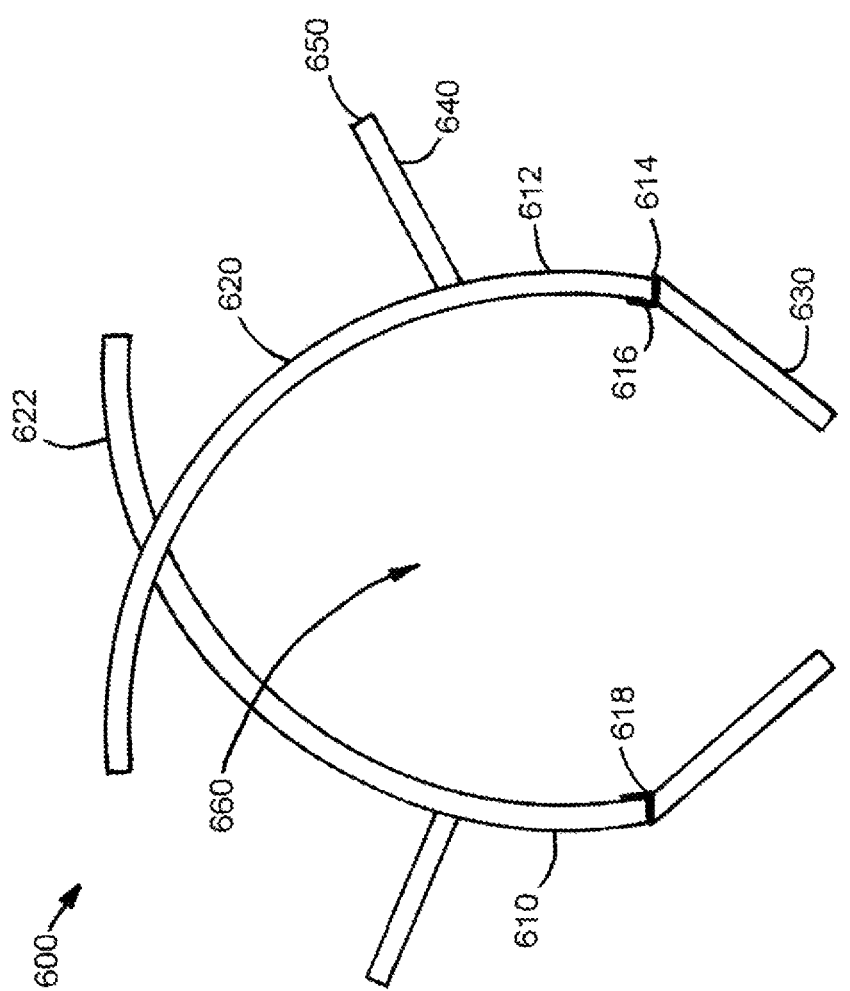
FIG. 6 illustrates an exemplary pair of rotating weight-activated rails in cross-section, in accordance with the present disclosure.

FIG. 6 illustrates an exemplary pair of rotating weight-activated rails in cross-section. Rotating rails can take a number of different shapes and profiles. According to the example of FIG. 6, a pair of complimentary rotating rails 610 and 612 are illustrated. The rails are similar to each other, with a distinction that arcuate arms 620 and 622 projecting upward are either offset or slightly angled to avoid hitting each other as the rails rotate. While arms 620 and 622 are illustrated as arcuate, the arms can take many forms including a number of straight sections joined together at angles, for example, forming a segment of a polygon with a discreet number of sides. Rails 612 is formed about a rotating pole or member to which arms 620 projecting upward and arms 630 projecting downward are connected. In the exemplary embodiment of FIG. 6, arms 620 and 630 are illustrated connected to a length 616 of angle steel which are rotatably affixed at either end to a fixture such as holes in end support vertical members such that the rails rotate about exemplary points 616 and 618. Rails 610 and 612 are separated and include a space 660 therebetween that is sized to accept a bale. A bale within space 660 presses down upon arms 630, such that the attached rail 612 rotates counter clockwise, with arms 620 pressing against a side of the bale. The same condition exists in rail 610, such that the weight of the bale activates the rotating rails and causes arms 620 and 622 to contain and compress the sides of a contained bale. Exemplary diverting rails 650 and diverting rail ribs 640 are illustrated, permitting an animal access to the bale through arms 612 without letting the animal to get too close to arms 612.

Figure 7:
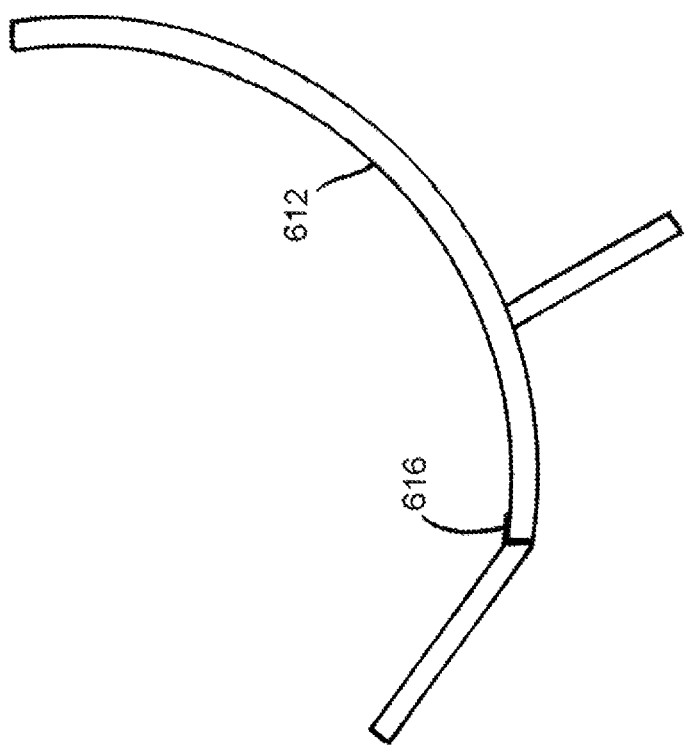
FIG. 7 illustrates the rotating weight-activated rails of FIG. 6 in an open condition, ready to accept a bale, in accordance with the present disclosure.
Figure 7:
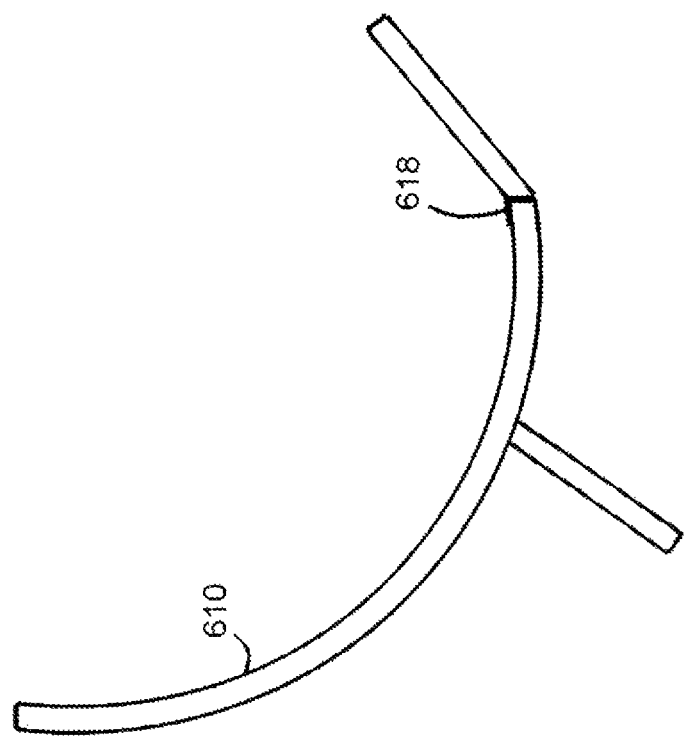

FIG. 7 illustrates the rotating weight-activated rails of FIG. 6 in an open condition, ready to accept a bale. Rails 610 and 612 are rotated outwardly about points 618 and 616, respectively, into an open condition such that a bale can be set upon the arms and the arms will close in around the bale. The arms can easily be swung into such an open condition when the rack is empty, for example, by manually moving the arms or by using the forces of a tractor to push up on the arms projecting downward.

Figure 8:
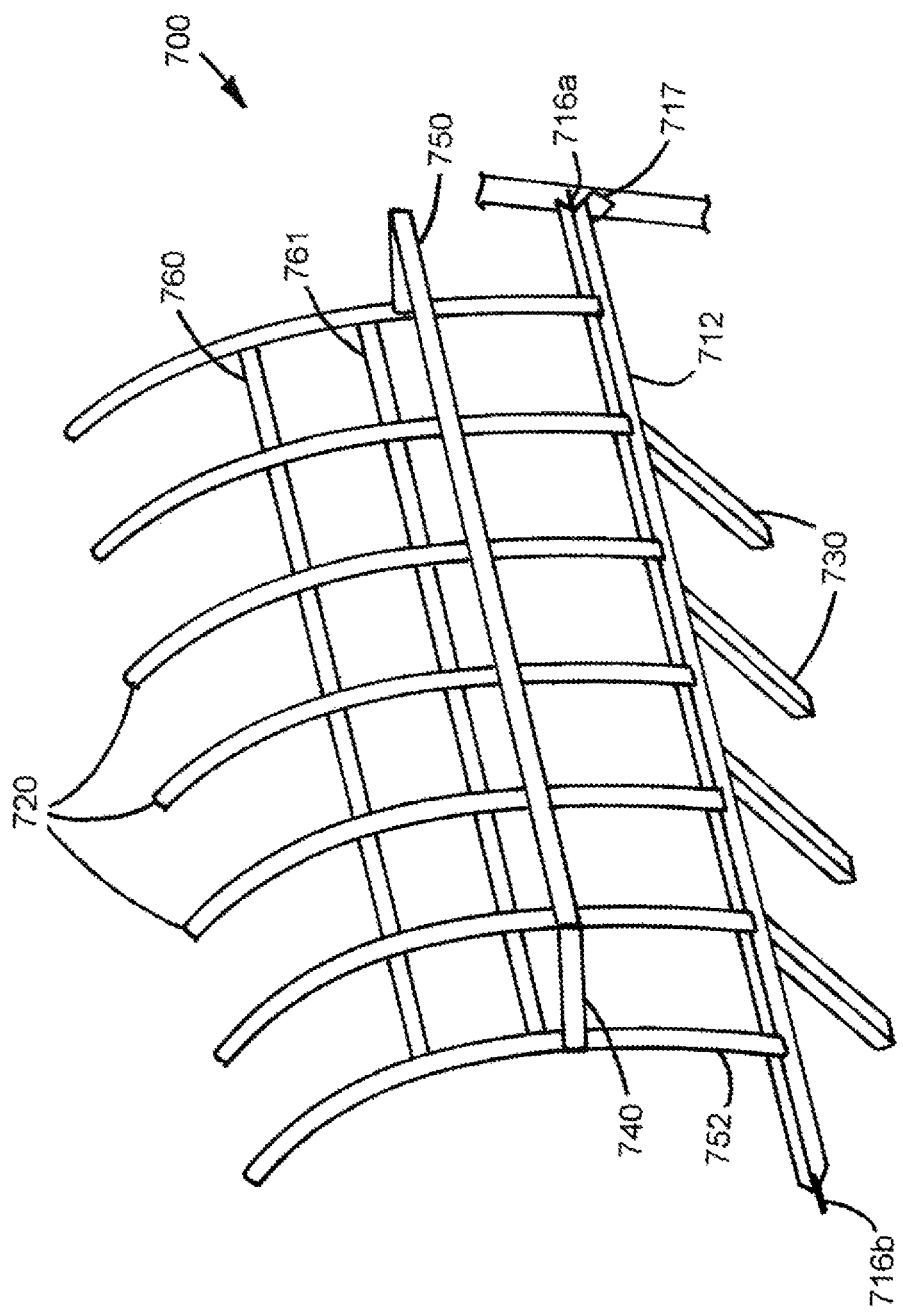
FIG. 8 illustrates an exemplary rotating weight-activated rail in a perspective view, in accordance with the present disclosure.

FIG. 8 illustrates an exemplary rotating weight-activated rail in a perspective view. Rail 700 is exemplary of rail 612. Rail 700 is constructed about a rotating member 712. Rotating member 712 includes axle bracket 717 and rotates about axles 716a and 716b which are engaged to fixtures such as vertical members of neighboring end supports. Arms 720 projecting upward and arms 730 projecting downward are illustrated attached to rotating member 712. Gaps between arms 620 are provided according to a critical width as defined for the particular livestock for which the rack is intended, for example, nine inches for cattle. Distances between arms 730 can be greater than the critical width. When there is a bale within the rack, arms 730 are so low and rotated under the bale that it would unnatural and much harder for an animal to reach the bale and feed from below the bale. As a bale is depleted and becomes smaller and smaller, eventually, the user wants the remnants of the bail to fall through the gap between arms projecting downward such that the rack can be refilled. A larger gap between the arms 730 facilitates the loose remnants of a bale to fall down as desired. Further, because the remnants are about to fall out of the rack anyway, the larger gaps between arms 730 encourage animals to go after larger chunks of the remaining bale rather than just letting more of the bale fall onto the ground below the rack. A pan, sheet, or other trap can optionally be located below arms 730 to stop hay remnants from hitting the ground. Such a pan would be a tradeoff, as more of the bale may be eaten from the pan, but the remnants in the pan may need to be brushed off by the user between bales to clear the area and prevent the arms 730 from being fouled by the remnants of the last bale. Diverting rail 750 is illustrated including diverting rail bracket 740. More than one diverting rail can be utilized. Reinforcing member 760 and 761 can be used, for example, constructed of rebar, to prevent the arms from being bent or strained over time.

FIG. 9 illustrates the weight-activated rails of FIG. 6 with a fresh bale situated thereto. Rails 610 and 612 are illustrated rotating about points 618 and 616, respectively. Bale 800 is illustrated, having been set between the rails. The weight of bale 800 is pressing down upon arms 630 and 632, such that the rails are rotated into position, holding the sides of bale 800. FIG. 10 illustrates the weight-activated rails of FIG. 9, wherein the bale situated within the rack has been partially depleted. Rails 610 and 612 are illustrated rotating about points 618 and 616, respectively. Bale 802 is illustrated, wherein diminishing size of bale 802 has permitting the rails to rotate moderately, and a gap between arms 630 and 632 is beginning to widen. However, bale 802 is still substantially held in place by the rails and wastage of the bale upon the ground is prevented. FIG. 11 illustrates the weight-activated rails of FIG. 9, wherein the bale situated within the rack has been fully depleted. Rails 610 and 612 are illustrated rotating about points 618 and 616, respectively. Bale 804 is illustrated, wherein animals have eaten from the bale such that only a remnant of the bale remains. The arms 610 and 612 are no longer held outward by the bale and have rotated to a fully inward condition. A gap between arms 630 and 632 is at a maximum, such that bale 804 can fall into area 810 below the rails.

Figure 12:
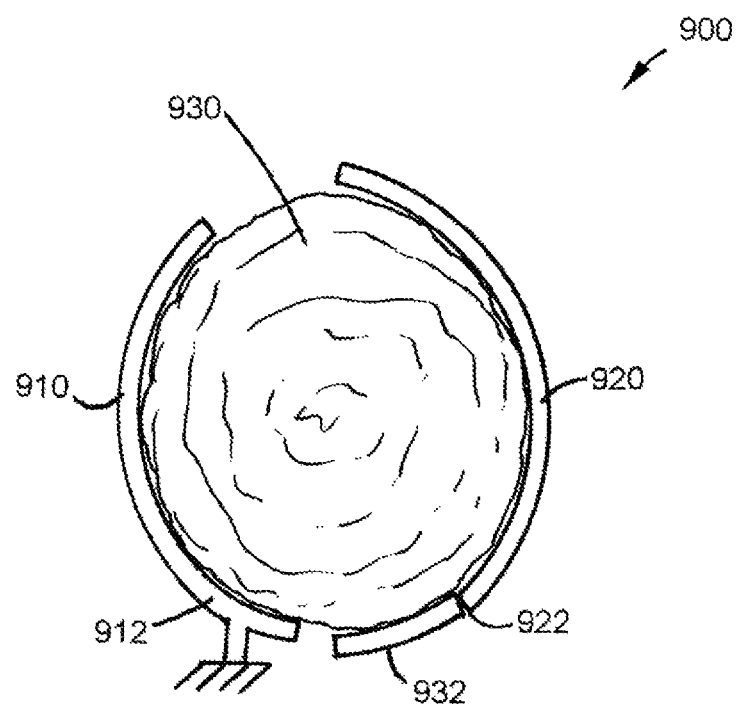
FIG. 12 illustrates an exemplary rack in cross-section that can be used with one rotating weight-activated rail, in accordance with the present disclosure.

Variations upon the disclosed rack are envisioned. For example, instead of using two rotating weight-activating racks, one can be utilized. FIG. 12 illustrates an exemplary rack in cross-section that can be used with one rotating weight-activated rail. Rack 900 including stopping wall 910 is illustrated, with wall 910 holding one side of bale 930, with a rotating weight-activated rails 920 rotating about point 922. Such a stopping wall 910 would need to be used with a rigid base that can withstand a constant load pressing against the wall or within a pen or barn where the rack can be fixed in concrete or some other permanent foundation. According to embodiments disclosed herein, arms of rail 920 can securingly contain bale 930 based upon the weight of the bale pressing downward on arms 932 of rail 920. Wall 910 is configured to contain and accept some of the weight of bale 930, while causing some or much of the weight of bale 930 to rest upon arms 932. Wall 910 can include angled section 912, such that when a bale is mostly depleted, the remnants will slide down section 912 and fall through a gap between section 912 and arms 932 when rail 920 is rotated entirely counter clockwise into an inward condition. A number of alternative rack embodiments are envisioned, and the disclosure is not intend to be limited to the particular examples provided herein.

Figure 13:
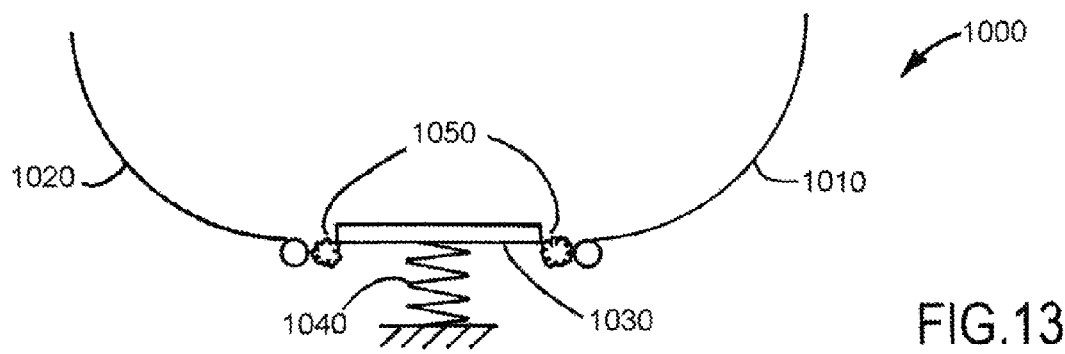
FIG. 13 illustrates an alternative exemplary embodiment of a rack for holding a bale and providing livestock limited access to be bale, wherein weight of the bale causes arms of the rack to rotate against and press against the sides of the bale, in accordance with the present disclosure.

FIG. 13 illustrates an alternative exemplary embodiment of a rack for holding a bale and providing livestock limited access to be bale, wherein weight of the bale causes arms of the rack to rotate against and press against the sides of the bale. Rack 1000 comprises arms projecting upward 1010 and 1020 and weight activated platform 1030. When a bale is loaded upon platform 1030, spring mechanism 1040 is depressed and mechanical linkages 1050 transfer movement of platform 1030 to cause arms 1010 and 1020 to press against the sides of the bale. Rack 1000 is exemplary of an alternative device that can transfer weight of a bale into arms of a rack pressing against and containing the bale. A number of alternative embodiments are envisioned, and the disclosure is not intended to be limited to the examples provided herein.

Figure 14:
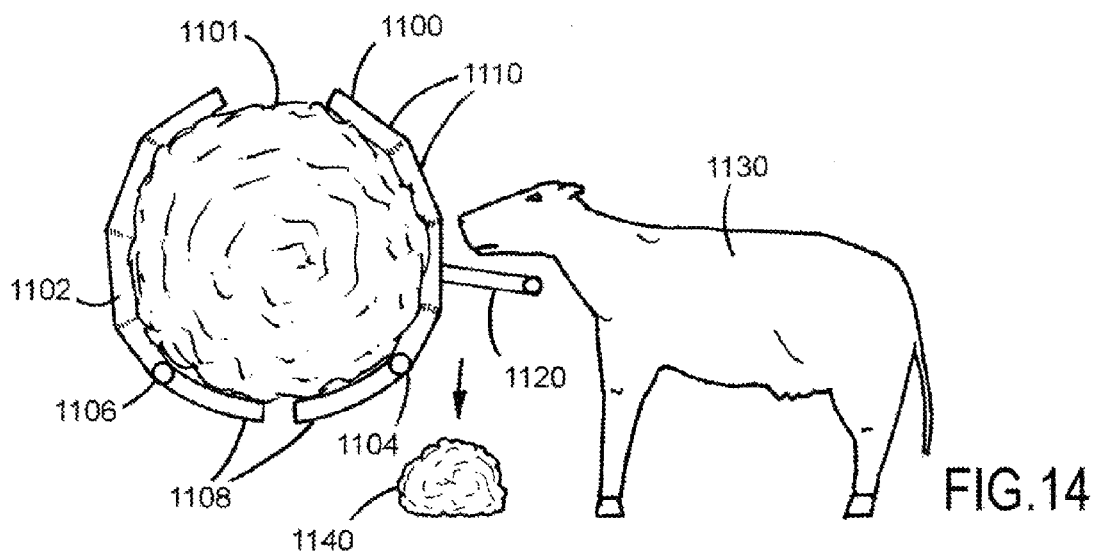
FIGS. 14 and 15 illustrate an exemplary rack reducing waste, in accordance with the present disclosure.
Figure 15:
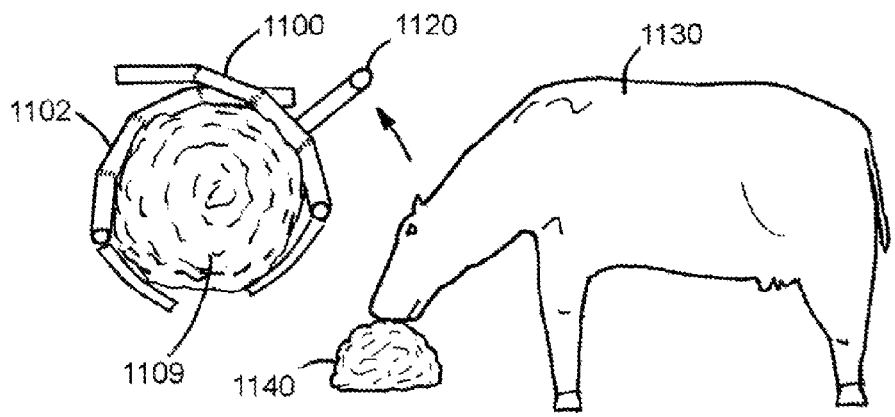

Racks used to contain bales reduce wastage, in some cases, from 20-25% of the bale being wasted to less than 5% of the bale being wasted. FIGS. 14 and 15 illustrate an exemplary rack reducing waste. FIG. 14 illustrates a rack including rotating rails 1100 and 1102, rotating about axes 1104 and 1106, respectively, and containing bale 1101. Arms 1100 and 1102 are each constructed of a series of straight bars 1110 attached together and each including curved arms 1108 extending under bale 1101. Animal 1130 is feeding off of bale 1101. Diverting rail 1120 is illustrated, attached to rail 1100, preventing animal 1130 from getting too close to the rack. As the animal feeds, portions 1140 of bale 1101 are pulled off by the animal and fall to the ground. Without diverting rail 1120, the animal would likely step on and trample portions 1140. Animals typically will refuse to feed on trampled portions of a bale. FIG. 15 illustrates the rack of FIG. 14 after the bale has been partially depleted. Arms 1100 and 1102 have rotated inwards as disclosed herein by the weight of partially depleted bale 1109. Diverting arm 1120 has rotated with arm 1100 and no longer keeps animal 1130 away from the rack. As portions 1140 are now accessible by the animal, the animal is more likely to feed on portions 1140 because they have not been trampled. Portions 1140 are not wasted by being trampled, but instead are preserved by the disclosed rack, increasing efficiency of the farming operation.

Racks can be configured in size for a particular bale size. A farmer using four foot round bales may want a smaller rack than a farmer using six foot round bales. Racks are illustrated consistently herein with round bales for clarity sake. However, the same or similar racks can be utilized with "square" or rectangular bales. If a round bale is six feet in length, a rack can be made, for example, six feet, six inches in length, such that a bale situated within the rack according to the figures of the disclosure would have about six inches of room split on either side of the rail to the adjoining end supports. If a farmer uses primarily eight feet long square bales, than a rack that is eight and a half feet long can be preferred. It is possible that a farmer can use an eight and a half foot rack to contain a six feet long round bale, although it is likely that animals will not be able to feed from one end of the rack.

Surfaces of the rack can be treated according to known methods to prevent corrosion. For example, primer and paint layers can be used. Galvanized steel or stainless steel can be utilized. A layer of polymer can be coated to the rack to increase the life of the materials and prevent degradation.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising a rack for feeding a cylindrically-shaped bale to animals, the bale having a length defined by opposing flat ends and a longitudinal axis, the device comprising:

two rigid end supports located at the opposing flat ends of the bale;

two horizontal struts running parallel to the longitudinal axis of the bale and connectingly holding in place the two rigid end supports;

first and second rotating members running parallel to the longitudinal axis of the bale on opposing sides of the bale and rotatingly connected to the each of the two rigid end supports at each respective end of each rotating member;

a rack defined by:

a plurality of lower arms extending downwardly from each rotating member and under the bale to support the weight of the bale, each lower arm terminating in an end; and a plurality of upward arms, separate from the lower arms, arcuately extending upwardly from each rotating member along a side and over a top of the bale to encapsulate the bale to prevent excess stripping of the bale;

wherein the plurality of lower arms are shorter than the plurality of upper arms;

wherein rotation of the rotating members in a first, outward direction places the rack in an open condition, with the plurality of upper arms spreading apart to receive a bale; and wherein the weight of the received bale against the lower arms facilitates rotation of the rotating members in a second, inward direction, creating an increasing gap between the ends of the lower arms to permit a remnant of the bale to drop downwardly to ground when the bale has been depleted.

2. The device of claim 1, wherein the plurality of upward arms are spaced to be no further apart than a critical width.

3. The device of claim 2, wherein the critical width is between eight inches and eleven inches.

4. The device of claim 2, wherein the critical width is nine inches.

5. The device of claim 2, wherein the end supports include gaps spaced according to the critical width.

6. The device of claim 1, wherein one of the end supports comprises a door to facilitate loading the bale into the rack.

7. The device of claim 1, wherein one of the end supports comprises vertical bars with gaps therebetween, facilitating loading the bale into the rack while permitting forks of a tractor to fit within the gaps.

8. The device of claim 1, comprising an auxiliary rail preventing excessive access to be bale between one of the end supports and one of the rotating weight-activated rails when a fresh bale is situated in the rack.

9. The device of claim 1, further comprising a diverting rail to prevent the animals from getting too close to the rack.

10. The device of claim 1, wherein the plurality of upper arms and the plurality of lower arms extending from each rotating member extend from substantially opposite sides of that member, thereby making each respective rotating weight-activated rail easier to turn.

* * * * *